United States Patent
Aoki et al.

(10) Patent No.: US 7,903,511 B2
(45) Date of Patent: Mar. 8, 2011

(54) OPTICAL INFORMATION REPRODUCING METHOD, OPTICAL INFORMATION REPRODUCING DEVICE, AND OPTICAL INFORMATION RECORDING MEDIUM FOR PERFORMING REPRODUCTION OF INFORMATION BY USING LASER BEAMS

(75) Inventors: Kazuhiko Aoki, Tokyo (JP); Takeharu Shibatoko, Tokyo (JP)

(73) Assignee: NEC Corporation, Tokyo (JP)

( * ) Notice: Subject to any disclaimer, the term of this patent is extended or adjusted under 35 U.S.C. 154(b) by 423 days.

(21) Appl. No.: 12/065,059

(22) PCT Filed: Jul. 31, 2006

(86) PCT No.: PCT/JP2006/315112
§ 371 (c)(1),
(2), (4) Date: Feb. 27, 2008

(87) PCT Pub. No.: WO2007/029430
PCT Pub. Date: Mar. 15, 2007

(65) Prior Publication Data
US 2009/0034391 A1    Feb. 5, 2009

(30) Foreign Application Priority Data
Sep. 5, 2005  (JP) .............................. 2005-256688

(51) Int. Cl.
*G11B 15/52* (2006.01)
(52) U.S. Cl. ...................................... 369/47.5; 369/53.27
(58) Field of Classification Search .................. None
See application file for complete search history.

(56) References Cited

U.S. PATENT DOCUMENTS

| 5,563,862 A * | 10/1996 | Udagawa ................... 369/53.24 |
| 6,845,074 B1 | 1/2005 | Fujita |
| 2001/0014067 A1 * | 8/2001 | Iwata et al. .................. 369/53.2 |
| 2002/0196719 A1 * | 12/2002 | Morishima ................ 369/47.53 |
| 2006/0176794 A1 * | 8/2006 | Ueki ............................ 369/53.2 |

FOREIGN PATENT DOCUMENTS

| EP | 1 077 449 A1 | 2/2001 |
| JP | H7-262617 A | 10/1995 |
| JP | H8-63817 A | 3/1996 |
| JP | H8-221839 A | 8/1996 |
| JP | 2001-56939 A | 2/2001 |
| JP | 2002-260308 A | 9/2002 |
| JP | 2004-13978 A | 1/2004 |

* cited by examiner

*Primary Examiner* — Paul Huber
(74) *Attorney, Agent, or Firm* — Sughrue Mion, PLLC

(57) ABSTRACT

[PROBLEMS] To provide an optical information reproducing device capable of performing excellent super resolution reproduction at all times without complicating the hardware structure. [MEANS FOR SOLVING PROBLEMS] An optical information reproducing device (10) irradiates a laser beam to an optical information recording medium (16) in which effective spot size of the irradiated laser beam changes in accordance with intensity of the laser beam and reproduces information. The optical information reproducing device (10) includes: an asymmetry detection unit (13) as asymmetry detection device for obtaining asymmetry from a reproduction signal obtained by reproducing the information; and a laser power adjusting unit (14) as laser power adjusting device for controlling the laser beam intensity according to the asymmetry obtained by the asymmetry detection unit (13).

28 Claims, 9 Drawing Sheets

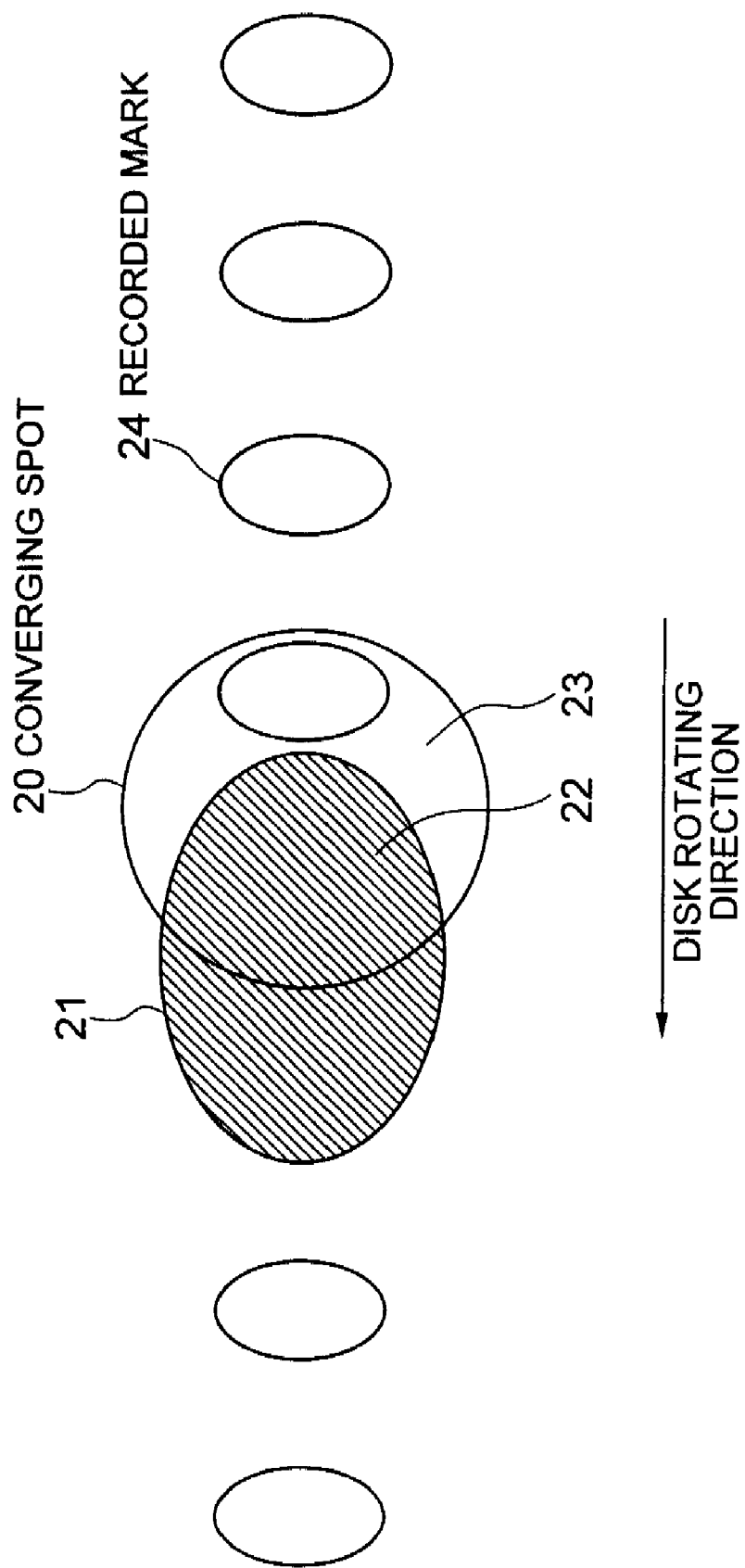

US 7,903,511 B2

OPTICAL INFORMATION REPRODUCING METHOD, OPTICAL INFORMATION REPRODUCING DEVICE, AND OPTICAL INFORMATION RECORDING MEDIUM FOR PERFORMING REPRODUCTION OF INFORMATION BY USING LASER BEAMS

This application is a 371 of PCT/JP2006/315112, filed Jul. 31, 2006.

TECHNICAL FIELD

The present invention relates to an optical information reproducing method, an optical information reproducing device, and an optical information recording medium for performing reproduction of information by using laser beams. More specifically, the present invention relates to an optical information reproducing method, an optical information reproducing device, and an optical information recording medium, which control the intensity of the laser beams at the time of reproduction.

BACKGROUND ART

An optical disk is an example of optical information recording media from which information is reproduced by using a laser beam. Optical disks are characterized as having a large capacity and are used broadly as media for distributing/storing images, music, or information in computers.

A capacity of an optical disk is determined depending on the size of marks to be recorded. That is, the smaller the marks to be recorded, the larger the capacity can be. The size of the recorded marks basically depends on converging spot size of laser beams used for reproducing information. That is, with a smaller spot size, still denser information can be reproduced without an error. The size of the spot at which laser beams are converged by an objective lens has a limited expanse, having the laser beams not converged at a single point even at the focal point thereof because of a diffraction effect of the light. This is generally referred to as a diffraction limit, which is a limit of the mark length that can be reproduced by $\lambda/(4NA)$, provided that a laser beam wavelength is $\lambda$, and the numerical aperture of the objective lens is NA.

For example, the reproduction limit of the mark length in an optical system of $\lambda=405$ nm and NA=0.85 is 119 nm, and the mark in the length equal to or shorter than 119 nm can not be read out accurately. In order to increase the capacity of the optical disk, the wavelength of the laser beams may be shortened or NA of the objective lens may be increased. However, when the wavelength of the laser beams is set to be shorter than 405 nm, it is difficult to manufacture optical components with a short wavelength and practical transmittance. Further, when NA of the objective lens is set to be larger than 0.85, it is difficult to manufacture a special objective lens with high NA. In addition, there is also such an issue of safety that it becomes highly possible for the objective lens and the optical disk to have a collision because the distance between the objective lens and the disk surface becomes short.

A medium super resolution technique is known as a technique for improving the reproduction resolution power by exceeding the diffraction limit. The medium super resolution uses a super resolution film whose properties such as the optical characteristic and the magnetic characteristic are changed nonlinearly depending on the temperatures or light intensities. Described herein by referring to FIG. 9 is a case where a super resolution film whose transmittance deteriorates at a certain temperature or higher, which is depicted in Patent Document 1, for example, is laid over a recording layer.

FIG. 9 is a fragmentary enlarged view of a single track taken out from recorded marks that are recorded along a spiral track on a recording layer of an optical disk. For simplification, only short marks are illustrated as recorded marks 24. A laser beam passed through the objective lens is irradiated on the recording layer as a converging spot 20. While the temperature is increased by irradiation of the laser beam, the converging spot 20 and an area 21 where the temperature becomes increased are not consistent because of revolving action of the optical disk. Thus, there are a high temperature area 22 and a low temperature area 23 mixed within the converging spot 20. Since the transmittance of the super resolution film laid over the recording layer becomes deteriorated in accordance with a temperature increase, the high temperature area 22 comes to have an effect of masking reproduction of information from the recording layer, and only the low temperature area 23 functions as an aperture part for reproducing the information on the recording layer. As a result, the size of the effective aperture that contributes to reproduction can be made smaller than the size of the converging spot that is determined depending on the diffraction limit. Therefore, it becomes possible to reproduce information of the minute recorded marks 24 that are smaller than the reproduction limit. As in this case, a super resolution reproduction method, which forms an effective aperture in the front side of the traveling direction of the converging spot by having the high temperature area as an optical mask, is referred to as FAD (Front Aperture Detection) method.

Further, Patent Document 2 and Patent Document 3 depict an optical reproducing device that is capable of constantly keeping the laser power to the optimum state by utilizing an amplitude ratio of reproduction signals with two different kinds of mark lengths that are recorded on an optical disk. In this optical reproducing device, the size of the effective aperture in the super resolution reproduction is kept as constant at all times to decrease a bit error rate by controlling the laser power such that the ratio of the reproduction signal amplitude becomes close to a prescribed value. With Patent Document 2, it is necessary to embed a special mark pattern by periodically providing an area used for controlling the laser power within a data recording area for obtaining the reproduction signal amplitudes of two kinds of mark lengths. Thus, the area for recording information data is decreased. In the meantime, with Patent Document 3, mark patterns of two kinds of mark lengths are detected from the mark patterns of information data recorded in a data recording area by matching. Thus, it is unnecessary to additionally provide an area used for controlling the laser power, so that the data recording area is not decreased.

Patent Document 1: Japanese Unexamined Patent Publication H7-262617

Patent Document 2: Japanese Unexamined Patent Publication H8-63817

Patent Document 3: Japanese Unexamined Patent Publication 2002-260308

DISCLOSURE OF THE INVENTION

Problems to be Solved by the Invention

In Patent Document 1, the size of the effective aperture generated at the time of super resolution reproduction changes depending on the laser power when the linear speed of the optical disk is constant. The change in the size of the effective aperture makes the reproduction signal asymmetrical to cause asymmetry, thereby deteriorating the bit error rate. Thus, there is an optimum laser power that makes the bit error rate be the minimum. However, the thermal characteristic and the like of the super resolution film vary depending on each optical disk, so that the optimum laser power varies for each optical disk. Further, the optimum value of the laser power changes depending on an external factor such as a change in the environmental temperatures. Therefore, the quality of signals to be outputted may become deteriorated even if the laser power is maintained to be constant at the time of reproduction.

Further, unlike Patent Document 2, it is unnecessary with Patent Document 3 to additionally provide the area used for controlling the laser power. However, it employs pattern matching so that an amount of arithmetic operation becomes vast for controlling the laser power. This brings up an issue from the economical view point, because the hardware structure becomes complicated.

An object of the present invention therefore is to provide an optical information reproducing method, an optical information reproducing device, and an optical information recording medium, which are capable of performing excellent super resolution reproduction at all times without complicating the hardware structure.

Means of Solving the Problem

The optical information reproducing method according to the present invention is a method which, when performing reproduction of information by irradiating a laser beam to an optical information recording medium in which effective spot size of the irradiated laser beam changes in accordance with intensity of the laser beam, obtains asymmetry from a reproduction signal that is obtained by reproducing the information, and controls the intensity of the laser beam based on the asymmetry. The optical information reproducing device according to the present invention is a device for performing reproduction of information by irradiating a laser beam to an optical information recording medium in which effective spot size of the irradiated laser beam changes in accordance with intensity of the laser beam. The device includes: an asymmetry detection device for obtaining asymmetry from a reproduction signal that is obtained by reproducing the information; and a laser power adjusting device for controlling the intensity of the laser beam based on the asymmetry obtained by the asymmetry detection device.

The asymmetry can be obtained from the reproduction signal by a simple arithmetic operation. Further, provided that the relation between the laser beam intensity and the quality of the reproduction is A and the relation between the laser intensity and the asymmetry is B, there is a clear correspondence between A and B. Therefore, even though it is a simple constitution, information can be reproduced finely through controlling the intensity of the laser beam based on the asymmetry.

For example, the laser beam intensity is controlled in such a manner that the asymmetry becomes close to a target value. Note here that the target value may be a value defined in advance, a value read out from the optical information recording medium, a value determined by reproducing information that is recorded to the optical information recording medium in advance, or the like. The target value herein includes numerical values of a specific range. That is, the laser beam intensity may be so controlled that the asymmetry falls within numerical values of a specific range.

As indicators for determining the quality of reproduction, there are a bit error rate, jitter amount, PRSNR (Partial Response Signal to Noise Ratio), and the like. Note here that a correlation between a bit error rate of the reproduction signal and the asymmetry may be obtained by reproducing the information, and the asymmetry corresponding to a minimum value of the bit error rate may be taken as the target value. Alternatively, a correlation between a jitter amount of the reproduction signal and the asymmetry may be obtained by reproducing the information, and the asymmetry corresponding to a minimum value of the jitter amount may be taken as the target value. Further, a correlation between PRSNR of the reproduction signal and the asymmetry may be obtained by reproducing the information, and the asymmetry corresponding to a maximum value of the PRSNR may be taken as the target value.

The indicators of the quality of these reproductions will be described in more details. "Bit error rate" literally is a rate of bit errors. A bit error rate can be obtained by comparing a recorded bit string and a reproduced bit string, and dividing unmatched bit number E by a measured bit number N. "Jitter amount" is a standard deflection of fluctuations in the edges of reproduced binary signals. There are two types in the jitter amount, i.e. "data to data" and "clock to data". In "data to data", a fluctuation in the edges of data itself is checked. In "clock to data", edge timing of a clock and edge timing of data are compared, and the standard deflection of the error (shift amount) is calculated. Used in a regular standard is the latter one, i.e. "clock to data". The "clock to data" is defined by $\sigma/T*100(\%)$, provided that the standard deflection of the edge shift (unit is time) is $\sigma$, and the channel clock cycle is T. It is 8% or smaller in the DVD standard. In a simple way, PRSNR can be described as follows. In PR12221, there are three kinds of paths that are prone to have errors, and SNR for each path is obtained. Then, the smallest SNR is considered as a critical path, and it is taken as PRSNR. PRSNR can be obtained in this manner. The bit error rate and the jitter amount described above are universal indicators irrespective of the standards, whereas PRSNR is an indicator for HD DVDs. Further, SNR can be obtained as follows. The distance between the paths is the same as the distance in the vector space, so that a signal is a norm (Euclidean distance) of the vector between the paths (referred to as an "errorvector" hereinafter). For example, a five-dimensional vector such as (1, 2, 2, 2, 1) becomes the error vector. A noise in the error vector is the effective noise between the paths, so that a normal noise is projected to the error vector. This becomes the noise. This means to take the inner product of (1, 2, 2, 2, 1) and the noise of five time units. SNR can be obtained through the above-described calculation. This calculation is performed on the three kinds of paths that are prone to have errors so as to obtain three kinds of SNR.

Furthermore, a relation between "plus/minus of a difference between the asymmetry and a target value" and "an increase/decrease of the intensity of the laser beam" may be defined in advance, and the intensity of the laser beam may be controlled in accordance with the relation such that the asymmetry becomes close to the target value. Alternatively, a relation between "plus/minus of a difference between the asymmetry and a target value" and "an increase/decrease of the intensity of the laser beam" may be read out from the optical information recording medium, and the intensity of the laser beam may be controlled in accordance with the relation such that the asymmetry becomes close to the target value. Further, a relation between "plus/minus of a difference between the asymmetry and a target value" and "an increase/decrease of the intensity of the laser beam" may be determined by reproducing information that is recorded to the optical information recording medium in advance, and the intensity of the laser beam may be controlled in accordance with the relation such that the asymmetry becomes close to the target value.

Further, the optical information recording medium is a recording medium in which effective spot size of an irradiated laser beam changes in accordance with intensity of the laser beam. It may be defined as a medium in which a target value of asymmetry for controlling intensity of the laser beam is recorded, a medium in which a relation between plus/minus of a difference between the asymmetry and a target value and an increase/decrease of the intensity of the laser beam is recorded, a medium including an area where information for determining a target value of asymmetry for controlling intensity of the laser beam is recorded in advance, or a medium including a super resolution layer whose optical characteristic or magnetic characteristic changes nonlinearly according to a temperature or a light intensity.

The present invention has been designed to achieve the foregoing objects. It is the optical information reproducing device for reproducing information by irradiation of a laser beam, which includes an asymmetry detection device for obtaining asymmetry from a reproduction signal; and a laser power adjusting device for controlling the intensity of the laser beam based on the asymmetry. The optical information reproducing device including these structures is capable of always keeping the size of an effective aperture constant that contributes to the super resolution reproduction through adjusting the laser power based on the asymmetry. Therefore, fine super resolution reproduction can be achieved at all times even when there is a change in external factors such as the environmental temperatures and the like or when there is variation in the thermal characteristic and the like of the super resolution films of each optical disk. Note here that "the effective size of a spot of a laser beam changes in accordance with the intensity of the laser beam" means that "the area contributing to reproduction among the spot of the irradiated laser beam changes in accordance with the intensity of the laser beam" or "the reflectance thereof changes in accordance with the intensity of the irradiated laser beam".

Advantageous Effect of the Invention

Even though it is in a simple constitution, the present invention is capable of reproducing information finely through obtaining the asymmetry from the reproduction signal and controlling the laser beam intensity based on the asymmetry. The reason is that the asymmetry can be obtained from the reproduction signal by a simple arithmetic operation and, provided that the relation between the laser beam intensity and the quality of the reproduction is A and the relation between the laser intensity and the asymmetry is B, there is a clear correspondence between A and B.

BEST MODE FOR CARRYING OUT THE INVENTION

FIG. 1 is a block diagram showing an exemplary embodiment of an optical information reproducing device according to the present invention. FIG. 2 is a block diagram showing an asymmetry detection unit shown in FIG. 1. Explanations are provided hereinafter by referring to these drawings.

In FIG. 1, an optical information reproducing device 10 according to this exemplary embodiment includes an optical head unit 11, a reproduction circuit 12, an asymmetry detection unit 13, a laser power adjusting unit 14, a laser driving circuit 15, and the like. Information recorded on an optical information recording medium 16 is detected as a change in the intensity of reflected light of a laser beam that is irradiated from the optical head unit 11, and it is read out by the reproduction circuit 12 as reproduction signals. The asymmetry detecting circuit 13 extracts asymmetry information from the reproduction signal that is read out by the reproduction circuit 12. The laser power adjusting unit 14 controls an instruction value of the laser beam intensity that is supplied to the laser driving circuit 15 based on the asymmetry information extracted by the asymmetry detection unit 13. The laser driving circuit 15 drives a laser that is provided inside the optical head unit 11, in accordance with the instruction value of the laser beam intensity that is supplied from the laser power adjusting unit 14.

In FIG. 2, a high-pass filter 30 extracts only a high frequency (RF) signal component from the reproduction signal read out by the reproduction circuit 12. A peak detection unit 31 and a bottom detection unit 32 detect a peak value and a bottom value, respectively, from the RF signal extracted through the high-pass filer 30. An adder 33, a subtractor 34, and a divider 35 derive asymmetry from the peak value and the bottom value of the RF signal. A reset part 36 resets the peak value and the bottom value of the peak detection unit 31 and the bottom detection unit 32, respectively.

In other words, the optical information reproducing device 10 reproduces information by irradiating a laser beam to the optical information recording medium 16 in which the effective area of the spot of the irradiated laser beam changes depending on the intensity of the laser beam, and the optical information device 10 is characterized to include the asymmetry detection unit 13 as an asymmetry detection device for obtaining asymmetry from the reproduction signal through reproduction of the information, and the laser power adjusting unit 14 as a laser power adjusting device for controlling the intensity of the laser beam based on the asymmetry obtained by the asymmetry detection unit 13.

The laser power adjusting unit 14 of this exemplary embodiment includes a device for storing a target value of the asymmetry in advance, a device for reading it out from the optical information recording medium 16, or a device for determining it by reproducing the information that is recorded to the optical information recording medium 16 in advance. Further, the laser power adjusting unit 14 includes a device for storing the relation between "plus/minus of a difference between the asymmetry and the target value" and "increase/decrease in the intensity of the laser beam" in advance, a device for reading it out from the optical information recording medium 16, or a device for determining it by reproducing the information that is recorded to the optical information recording medium 16 in advance. Each of these devices may not have to be provided to the laser power adjusting unit 14 but may be provided to other structural elements. Furthermore, the laser power adjusting unit 14 has a function of controlling the intensity of the laser beam in accordance with the relation in such a manner that the asymmetry comes closer to the target value.

The asymmetry can be obtained from the reproduction signal by a simple arithmetic operation. Further, provided that the relation between the laser beam intensity and the quality of the reproduction is A and the relation between the laser intensity and the asymmetry is B, there is a clear correspondence between A and B. Therefore, even though it is a simple constitution, information can be reproduced finely through controlling the intensity of the laser beam based on the asymmetry.

Now, actions of the optical information reproducing device 10 when performing reproduction from a super resolution recording medium will be described in detail.

First, the laser driving circuit 15 drives the laser provided within the optical head unit 11, in accordance with an initial instruction value of the laser beam intensity that is supplied from the laserpower adjusting unit 14. Information recorded on the optical information recording medium 16 is detected as a change in the intensity of the reflected light of the irradiated laser beam, and it is read out as a reproduction signal via the reproduction unit 2. Then, asymmetry information is extracted from the reproduction signal by the asymmetry detection unit 13.

A method for calculating the asymmetry will be described. FIG. 3 is an illustration showing an example of reproduction signal waveforms. Asymmetry A can be obtained by a following calculating equation, provided that the amplitude, the maximum value, and the minimum value of the longest mark reproduction signal are referred to as ILong, ILong-H, and ILong-L, respectively, and the maximum value and the minimum value of the shortest mark reproduction signal are referred to as IShort-H, and IShort-L, respectively.

$$A=[(I\text{Long-}H+I\text{Long-}L)/2-(I\text{Short-}H+I\text{Short-}L)/2]/I\text{Long}$$

$$I\text{Long}=I\text{Long-}H-I\text{Long-}L$$

Next, actions of the asymmetry detection unit 13 will be described by referring to FIG. 4. FIG. 4 is an illustration showing an example of waveforms of an RF signal that has passed through the high-pass filter 30. The asymmetry can be obtained from the reproduction signal waveform with a DC level as shown in FIG. 3 and also from the RF signal waveform having no DC level as shown in FIG. 4. As a device structure of the detection unit, it can be formed as a still simpler structure with the signal having no DC level. Thus, a method of obtaining the symmetry from the RF signal waveform shown in FIG. 4 will be described herein.

For the RF signal that has passed through the high-pass filter 30, the center value of the shortest mark reproduction signal comes almost in the vicinity of 0 ((IShort-H+IShort-L)/2=0). Further, the peak detection unit 31 peak-holds the RF signal, and the bottom detection unit 32 bottom-holds the RF signal. By using the peak value Ipeak and the bottom value Ibottom detected by the peak detection unit 31 and the bottom detection unit 32, respectively, the center value of the longest mark reproduction signal is obtained by the adder 33 as (ILong-H+ILong-L)/2=(Ipeak+Ibottom)/2. Further, the amplitude of the longest mark reproduction signal is obtained by the subtractor 34 as ILong=Ipeak−Ibottom. At this time, the asymmetry is obtained by the divider 35 as A=(Ipeak+Ibottom)/2/(Ipeak−Ibottom). Every time the asymmetry is detected, the reset part 36 resets the held values of the peak detection unit 31 and the bottom detection unit 32.

As shown in FIG. 5, the bit error rate of the super resolution reproduction signal shows such a characteristic that it exhibits the minimum value for changes in the laser beam intensity. In the meantime, in a case of the FAD method, asymmetry decreases monotonously for an increase of the laser beam intensity. When the initial instruction value of the laser beam intensity is appropriate for the optical characteristic, the thermal characteristic, the environmental temperatures, and the like of the super resolution recording medium, the effective aperture contributing to the super resolution reproduction, which is on the super resolution recording medium, becomes a desirable size. Thus, the bit error rate of the super resolution reproduction signal takes the minimum value BERo. The optimum laser beam intensity at this time is Po, and the optimum asymmetry is Ao. For the initial instruction value of the laser beam intensity, the value registered in advance to the laser power adjusting unit 14 as the laser beam intensity for this type of recording medium may be used. Alternatively, the value recorded in a prescribed area of the recording medium as the laser beam intensity of this type of recording medium may also be used.

Note here that there are cases where the initial instruction value of the laser beam intensity becomes different from the laser beam intensity that provides the minimum bit error rate because of variations in the optical characteristic and the thermal characteristic of each recording medium, or because of changes in the environmental temperatures. In such cases, the size of the effective aperture contributing to the super resolution reproduction becomes shifted from the desirable size with the intensity of the laser beam that is irradiated according to the initial instruction value. Thus, a proper super resolution phenomenon cannot be induced. The asymmetry is also shifted from the optimum value at this time. For example, when the environmental temperature increases and the curve showing the relation between the laser beam intensity and the bit error rate becomes shifted to the low power side as in a shift from a solid line to a dotted line of FIG. 5, the area of a high-temperature part functioning as the optical mask becomes expanded and the size of the effective aperture becomes reduced from the optimum size, if the laser beam intensity is remained as Po. FIG. 6 shows the waveform of the reproduction signal at this time. The asymmetry becomes A1 (FIG. 5) that is deviated on the minus side with respect to the optimum value, and the bit error rate of the reproduction signal is increased to BER1 (FIG. 5) that is larger than the minimum value.

Thus, in this exemplary embodiment, the laser power adjusting unit 14 adjusts the instruction value for the laser driving circuit 15 so as to make the value be the optimum value Ao based on the asymmetry value that is extracted by the asymmetry detection unit 13. Specifically, when the asymmetry takes the value such as A1 that is smaller than the optimum value Ao and the difference between the asymmetry and the asymmetry optimum value becomes minus, the laser beam intensity is changed to a minus direction to be in the same sign. Inversely, when the asymmetry takes the value such as A2 that is larger than the optimum value Ao and the difference between the asymmetry and the asymmetry optimum value becomes plus, the laser beam intensity is changed to a plus direction to be in the same sign. Through controlling the laser beam intensity so that the asymmetry takes the optimum value Ao at all times, the laser beam intensity becomes a new optimum value Po' that provides the minimum bit error rate. The bit error rate of the reproduction signal at this time also becomes a minimum value BERo. As a result, it becomes possible to keep the size of the effective aperture that contributes to the super resolution reproduction to be the desirable size at all times, even if there are external fluctuating factors such as variations in the thermal characteristic and the optical characteristic of the optical information recording medium 16, in the environmental temperatures, etc. Therefore, stable super resolution reproduction can be achieved.

For the optimum value (that is, the target value) of the asymmetry with which the bit error rate becomes the minimum, the value registered in advance to the laser adjusting unit 14 as the asymmetry optimum value for this type of recording medium may be used. Alternatively, the value recorded in a prescribed area of the optical information recording medium 16 as the asymmetry optimum value of the optical information recording medium 16 may be used. Further, if information is recorded to the optical information recording medium 16, e.g. the asymmetry optimum value=0, it is possible to omit the registration of the asymmetry optimum value to the laser power adjusting unit 14 or recording it to the optical information recording medium 16 in advance. More desirably, in the combinations of each of the optical heads and super resolution recording media, the optimum value of the asymmetry with which the bit error rate becomes the minimum is calibrated. Calibration can be performed by using a test pattern that is recorded in advance for measuring the bit error rate in a test area that is provided as appropriate in the area where user information is not recorded, such as a test pattern peripheral part of the optical information recording medium 16, for example.

In the exemplary embodiment described above, the optimum value of the asymmetry is obtained based on a condition where the bit error rate becomes the minimum. However, it is not limited to that. It is also possible to use other indicators that express the state of the reproduction signal. For example, there is a method using, instead of the bit error rate, PRSNR or jitter amount which can be measured still easier and has a correlation with the bit error rate. In this case, the optimum value of the asymmetry is obtained under a condition where the jitter amount becomes the minimum or PRSNR becomes the maximum. No special test pattern is required for measuring the jitter amount and PRSNR, and it is possible to measure those by random patterns recorded on a regular data area. Therefore, it is advantageous because the test area can be made smaller and the data area can be secured lager.

Furthermore, in the exemplary embodiment above, as the super resolution reproduction method, described is the FAD method in which the effective aperture is formed in the front side of the traveling direction of the converging spot by having the high-temperature part functioning as the optical mask. However, the super resolution reproduction method is not limited only to that. For example, the super resolution reproduction method may be a RAD (Rear Aperture Detection) method in which the effective aperture is formed in the rear side of the traveling direction of the converging spot through having the high-temperature part of the super resolution film functioning as the optical aperture because of an increase in the transmittance thereof, or may be a CAD method (Center Aperture Detection) method in which the effective aperture is formed near the center of the converging spot through having an area of a specific temperature functioning as the optical aperture because of an increase in the transmittance thereof. Further, while the super resolution recording medium using the super resolution film having a thermochromic effect with which the optical characteristic changes nonlinearly by the temperature increase is described, the super resolution recording medium is not limited only to that. It may be a super resolution recording medium using a super resolution film having a photochromic effect with which the optical characteristic changes nonlinearly by an increase in the intensity of the received light, or a magneto-optic recording type super resolution recording medium in which the magnetic characteristic changes nonlinearly by a temperature increase.

As a way of example, FIG. 7 shows the relation regarding the laser beam intensity, the bit error rate, and the asymmetry in a case of the RAD method. The relation between the laser beam intensity and the asymmetry is inverted from that of the super resolution recording medium of the FAD method shown in FIG. 5. From this, it can be seen that the laser power adjustment based on the asymmetry value in the case of the RAD method may be performed in the inverse direction from that of the FAD method. That is, when the difference between the asymmetry and the asymmetry optimum value becomes minus, the laser beam intensity is changed to the plus direction that is a different sign. Inversely, when the difference between the asymmetry and the asymmetry optimum value becomes plus, the laser beam intensity is changed to the minus direction that is a different sign. With this, the bit error rate can be maintained to be the minimum value and the fine super resolution reproduction can be achieved.

For determining whether the sign of the direction for changing the laser beam intensity and the sign of the difference between the asymmetry and the asymmetry optimum value are the same signs or different signs, the value registered in advance to the laser power adjusting unit 14 as the laser beam intensity changing direction for this type of recording medium may be used. Alternatively, the value registered in a prescribed area of the recording medium as the laser beam intensity changing direction for the recording medium may be used. Further, the value obtained by measuring an increase or decrease in the asymmetry with respect to an increase or decrease in the laser beam intensity may be used. The above-described test area may be used for the measurement. However, it is also possible to use random patterns recorded on a normal data area.

While the preferable exemplary embodiment of the optical information reproducing device according to the present invention has been described above, the optical information recording device according to the present invention is not limited only to the structures of that exemplary embodiment. It is to be understood that the present invention includes those with various modifications and changes applied to the structures of the above-described exemplary embodiment.

FIG. 8 is a flowchart showing an exemplary embodiment of an optical information reproducing method according to the present invention. Explanations will be provided hereinafter by referring to this drawing. This exemplary embodiment is a generalized form of the actions of the exemplary embodiment of the above-described optical information reproducing device according to the present invention.

First, a target value of asymmetry is obtained (step S101). This target value is a value defined in advance, a value read out from an optical information recording medium, or a value determined by reproducing the information recorded to the optical information recording medium in advance, for example. The target value may be defined as numerical values of a specific range.

For determining the target value of the asymmetry by reproducing the information that is recorded to the optical information recording medium in advance, it is performed as follows. As indicators for determining the quality of reproduction, there are a bit error rate, jitter amount, PRSNR, and the like. When using the bit error rate, the correlation between the bit error rate of the reproduction signal and the asymmetry is obtained by reproducing the information, and the asymmetry corresponding to the minimum value of the bit error rate is taken as the target value. When using the jitter amount, the correlation between the jitter amount of the reproduction signal and the asymmetry is obtained by reproducing the information, and the asymmetry corresponding to the minimum value of the jitter amount is taken as the target value. When using the PRSNR, the correlation between the PRSNR of the reproduction signal and the asymmetry is obtained by reproducing the information, and the asymmetry corresponding to the maximum value of the PRSNR is taken as the target value.

Subsequently, the relation between "plus/minus of a difference between the asymmetry and the target value" and "increase/decrease in the intensity of the laser beam" is obtained (step S102). This relation is a relation defined in advance, a relation read out from the optical information recording medium, or a relation determined by reproducing the information recorded to the optical information recording medium in advance, for example. For example, in the FAD method, there is found such a relation that the asymmetry decreases monotonously for an increase in the laser beam intensity. Inversely, in the RAD method, there is found such a relation that the asymmetry increases monotonously for an increase in the laser beam intensity.

Then, the asymmetry is obtained from the reproduction signal that is obtained by reproducing the information (step S103). The asymmetry can be obtained from the reproduction signal by a simple arithmetic operation.

Subsequently, based on the asymmetry obtained in the step S103, the laser beam intensity is controlled in accordance with the relation obtained in the step S102 (Step S104). For example, in the FAD method, the laser beam intensity is increased if the asymmetry is larger than the target value, and it is decreased if the asymmetry is smaller than the target value so as to bring the asymmetry closer to the target value. Inversely, in the RAD method, the laser beam intensity is decreased if the asymmetry is larger than the target value, and it is increased if the asymmetry is smaller than the target value so as to bring the asymmetry closer to the target value. The steps 103 and 104 are repeated as necessary until the reproduction is completed.

In this manner, the asymmetry can be obtained from the reproduction signal by a simple arithmetic operation. Further, provided that the relation between the laser beam intensity and the quality of the reproduction is A and the relation between the laser beam intensity and the asymmetry is B, there is a clear correspondence between A and B. Therefore, even though it is a simple constitution, information can be reproduced finely through controlling the intensity of the laser beam based on the asymmetry.

In other words, it is possible with the present invention to achieve fine super resolution reproduction at all times without complicating the hardware structure, even when there is a change in an external factor such as the environmental temperatures or when there is variation in the characteristic and the like of the super resolution films for each disk. It is because the laser power is controlled based on the asymmetry that requires no complicated hardware for detection.

The asymmetry can be measured by a modulated ordinal signal pattern (data area). In addition, the device is structured to measure the asymmetry always at the time of reproducing the signal. In the meantime, for measuring the bit error rate, there is required an exclusive-use test pattern whose recording bit is known. For measuring the jitter amount or PRSNR, such exclusive-use test pattern is not required. However, exclusive-use hardware is required for measuring those, and it is undesirable to have it operated at all times when reproducing the signal. Furthermore, since the asymmetry exhibits a monotone function for the intensity of the reproducing laser beam, it is possible to clearly see whether the parameter is shifted to an increase side or to a decrease side. Thus, the direction to which the reproducing laser beam intensity should be adjusted can be determined clearly. In the meantime, the bit error rate, the jitter amount, and PRSNR are all non-monotone functions. Thus, it is not possible to clearly see whether the parameter is shifted to an increase side or to a decrease side. Therefore, the direction to which the reproducing laser beam intensity should be adjusted cannot be determined clearly, so that it becomes necessary to carry out the so-called hill-climbing search, for example, for optimization. Therefore, it is inconvenient to measure the bit error rate, the jitter amount, or PRSNR instead of the asymmetry, and to control the reproducing laser beam intensity to make the value of those to be the minimum (the maximum for PRSNR) at the same time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-256688, filed on Sep. 5, 2005, the disclosure of which is incorporated herein in its entirety by reference.

BRIEF DESCRIPTION OF THE DRAWINGS

FIG. 9 is a plan view showing the principle of the super resolution reproduction in a medium super resolution.

REFERENCE NUMERALS

Figure 1:
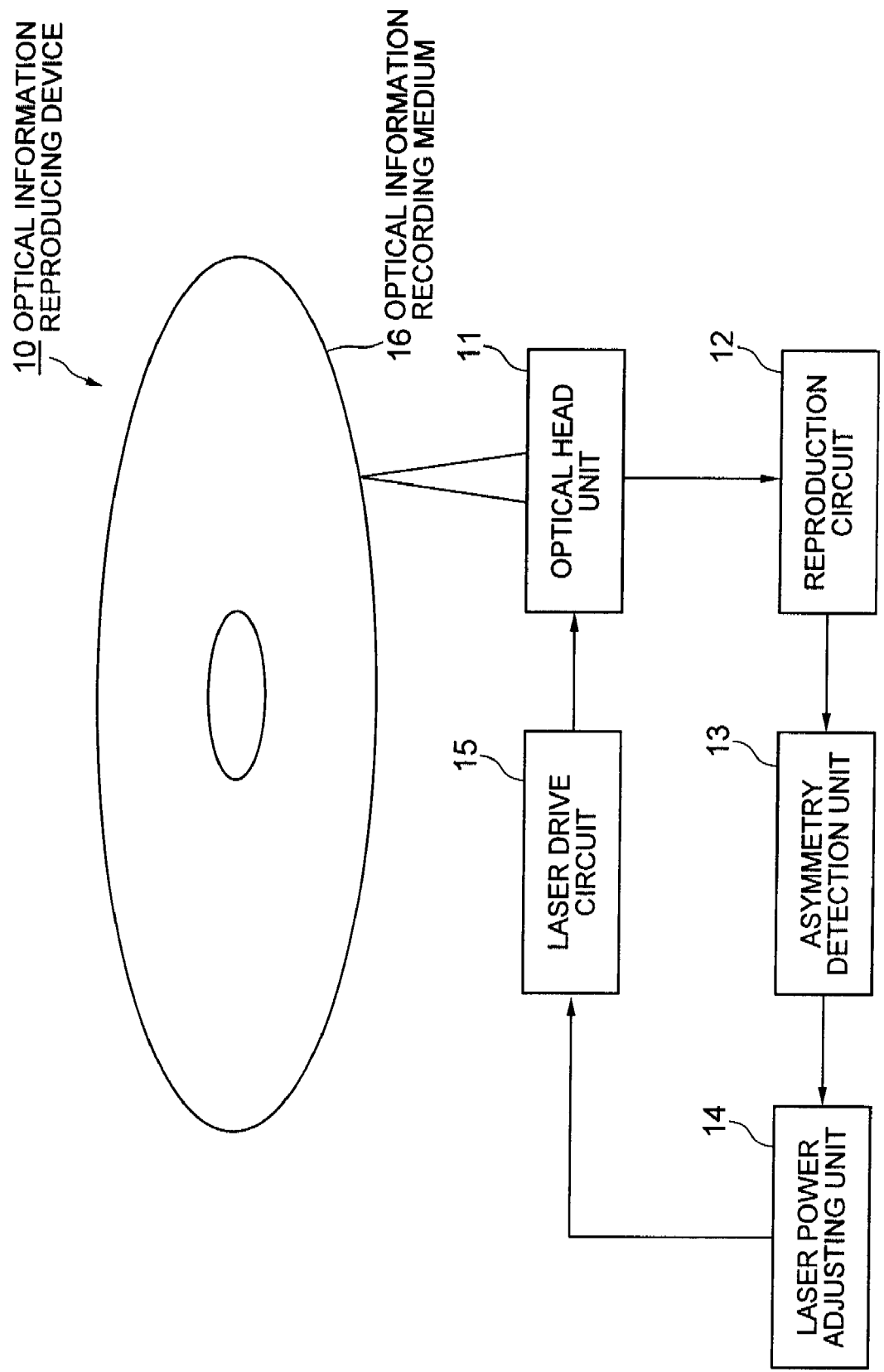
FIG. 1 is a block diagram showing an exemplary embodiment of an optical information reproducing device according to the present invention.
Figure 2:
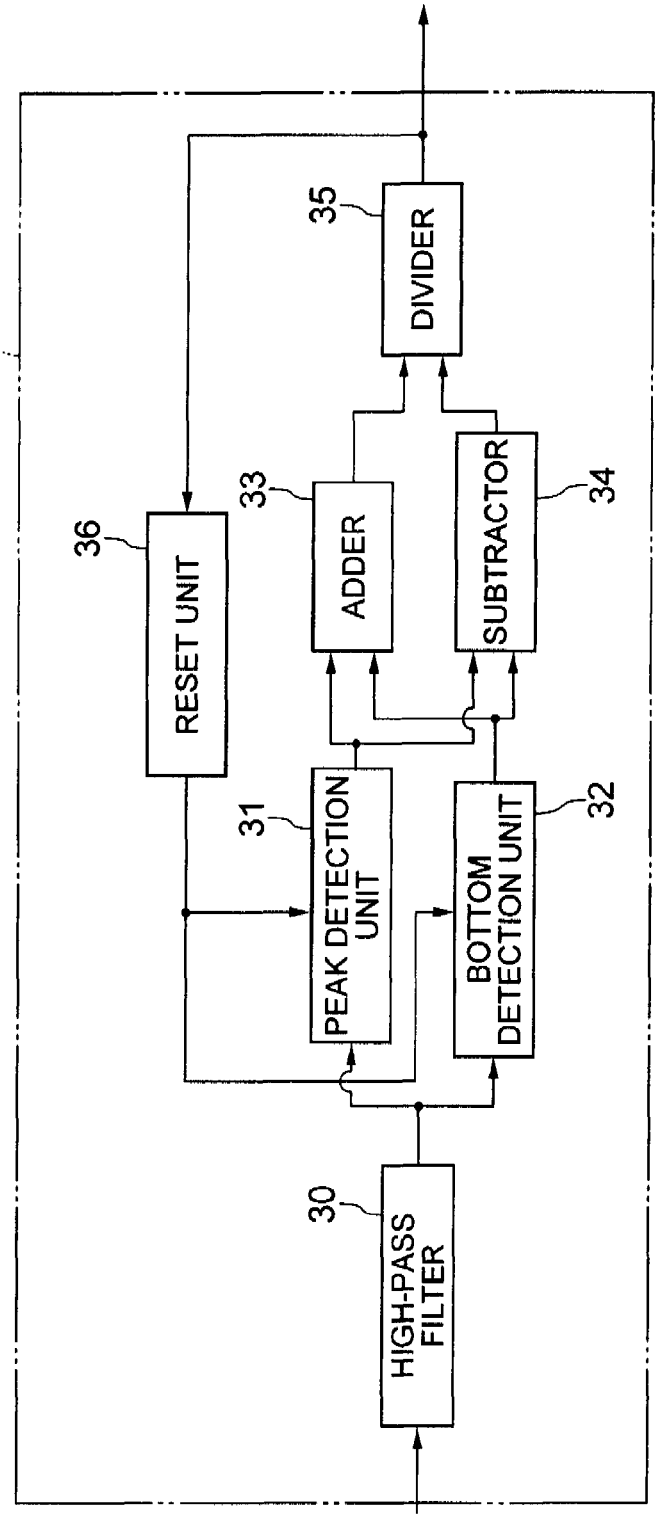
FIG. 2 is a block diagram showing an asymmetry detection unit shown in FIG. 1.
Figure 3:
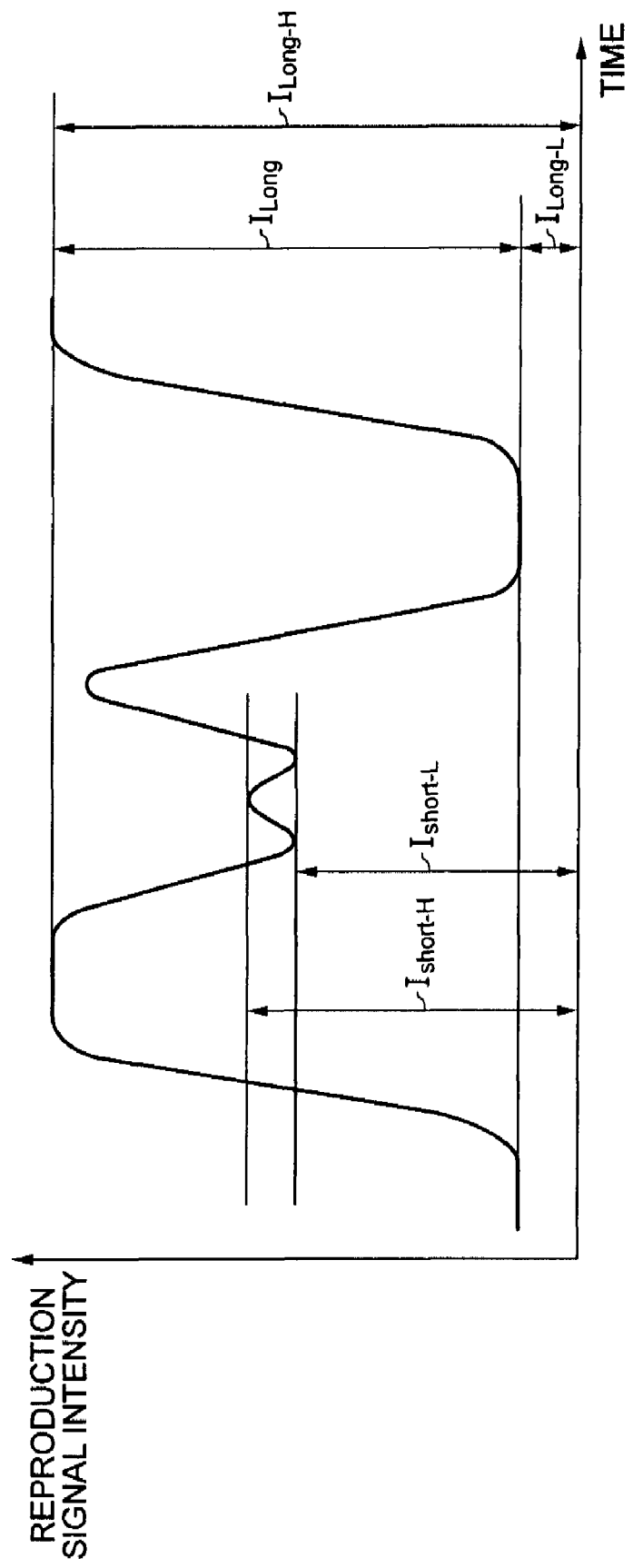
FIG. 3 is a waveform chart of a reproduction signal under an optimum super resolution state.
Figure 4:
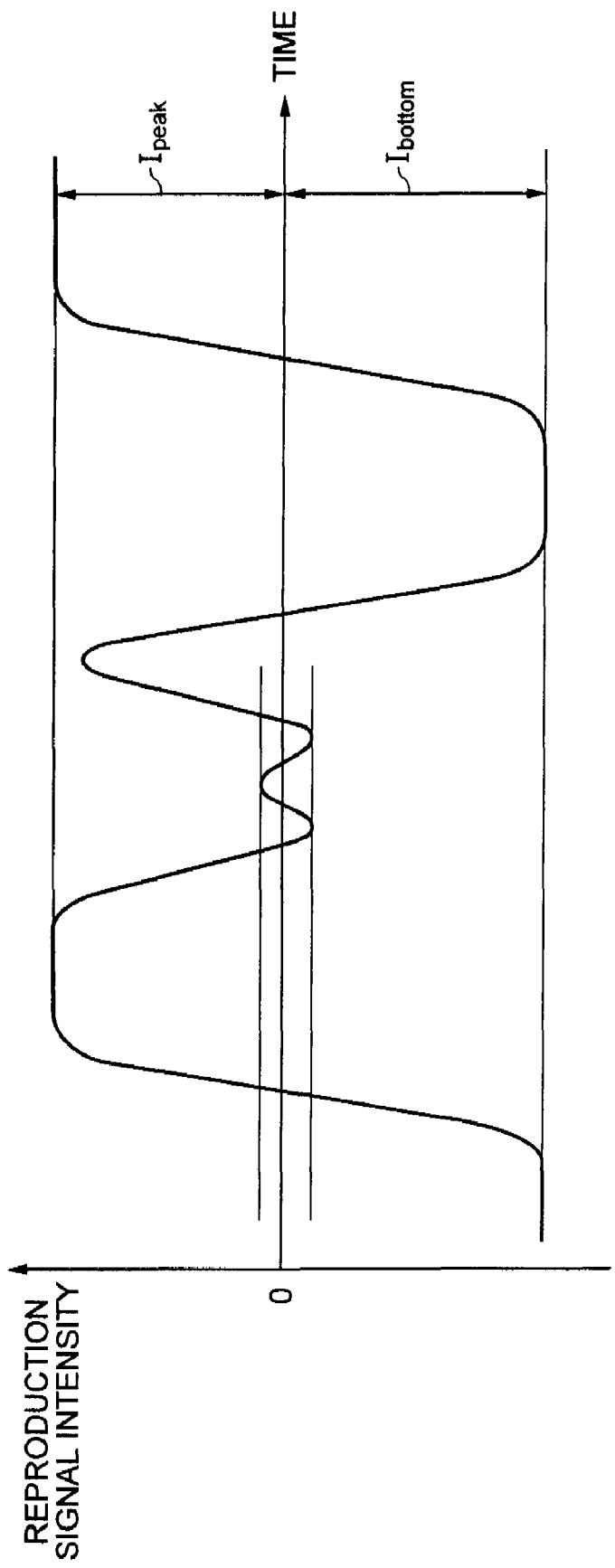
FIG. 4 is waveform chart of an RF signal under an optimum super resolution state.
Figure 5:
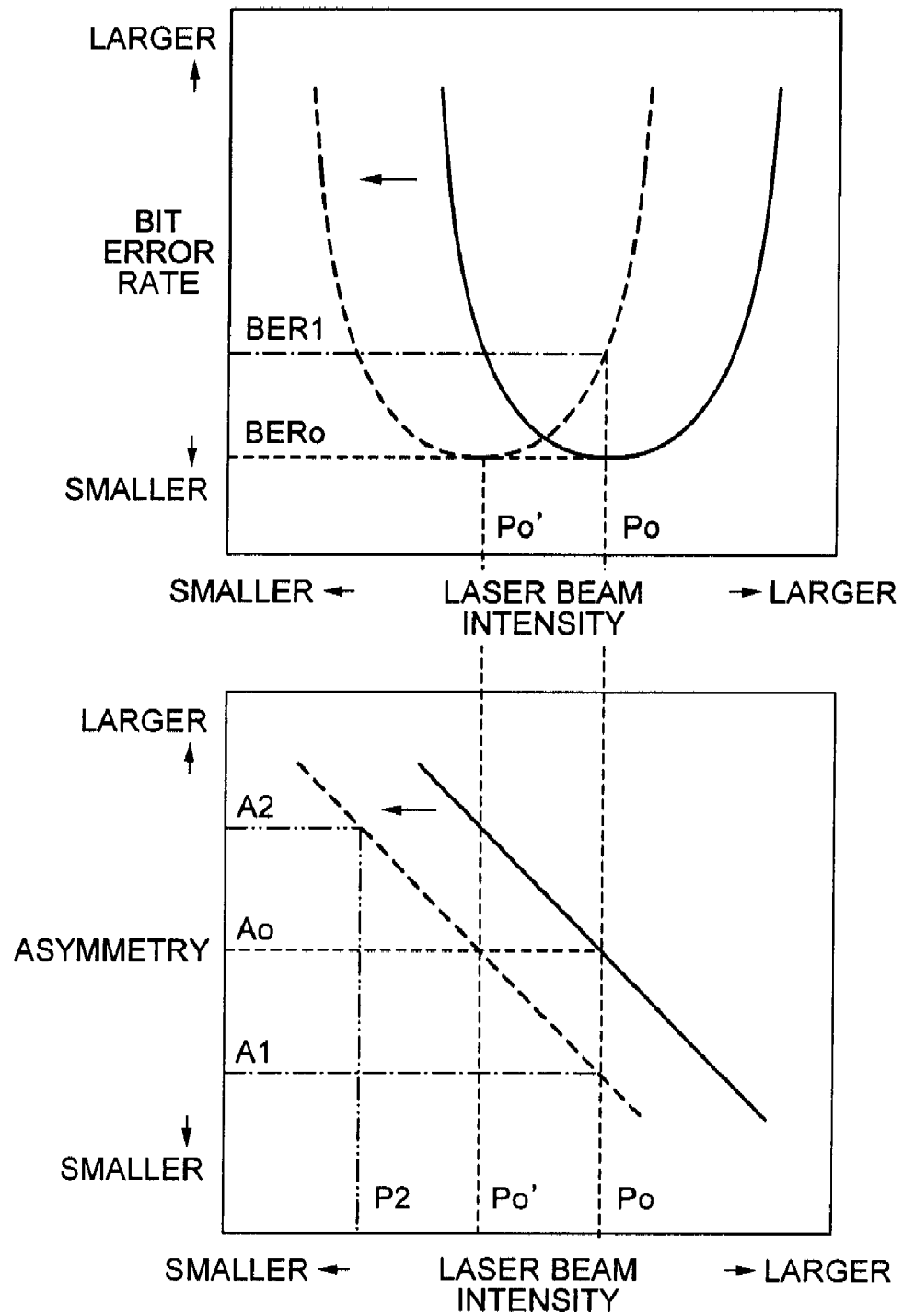
FIG. 5 is a graph showing a relation regarding a laser power, bit error rate, and asymmetry in a super resolution reproduction of a FAD method.
Figure 6:
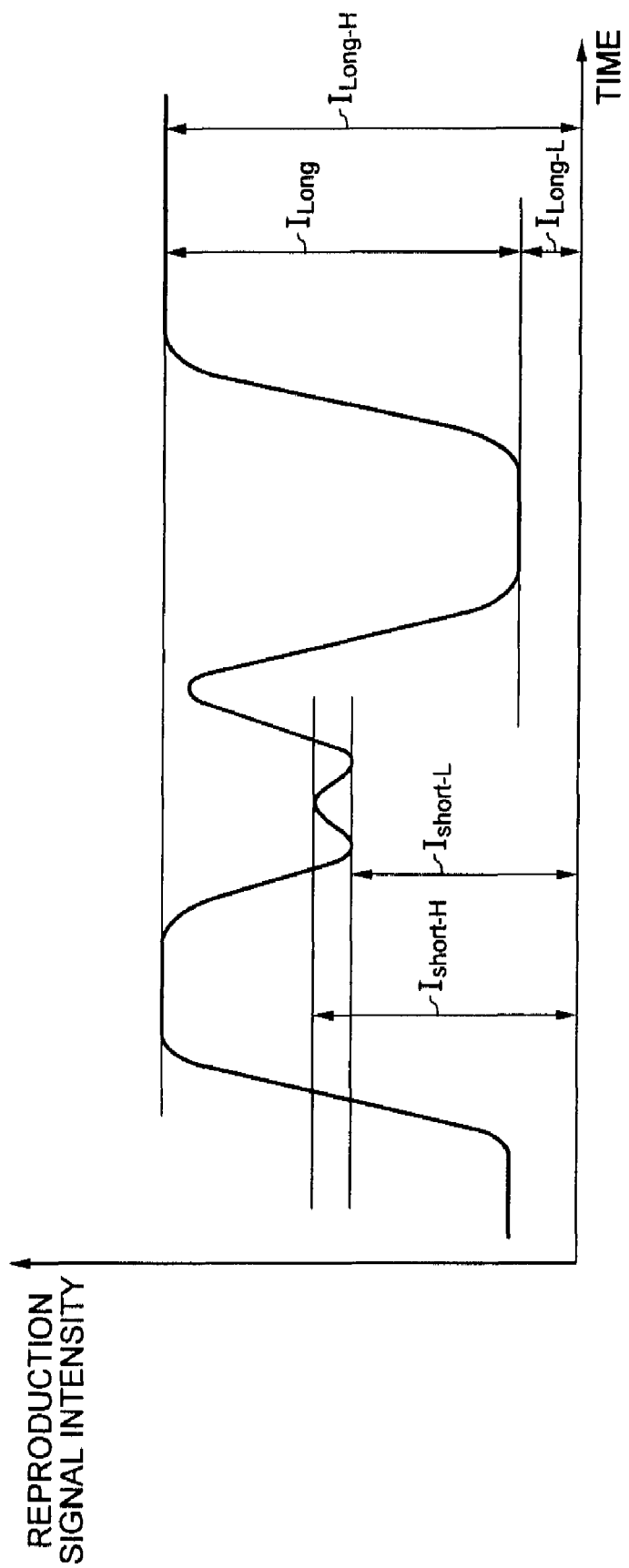
FIG. 6 is a waveform chart of a reproduction signal under a condition that is different from the optimum super resolution state.
Figure 7:
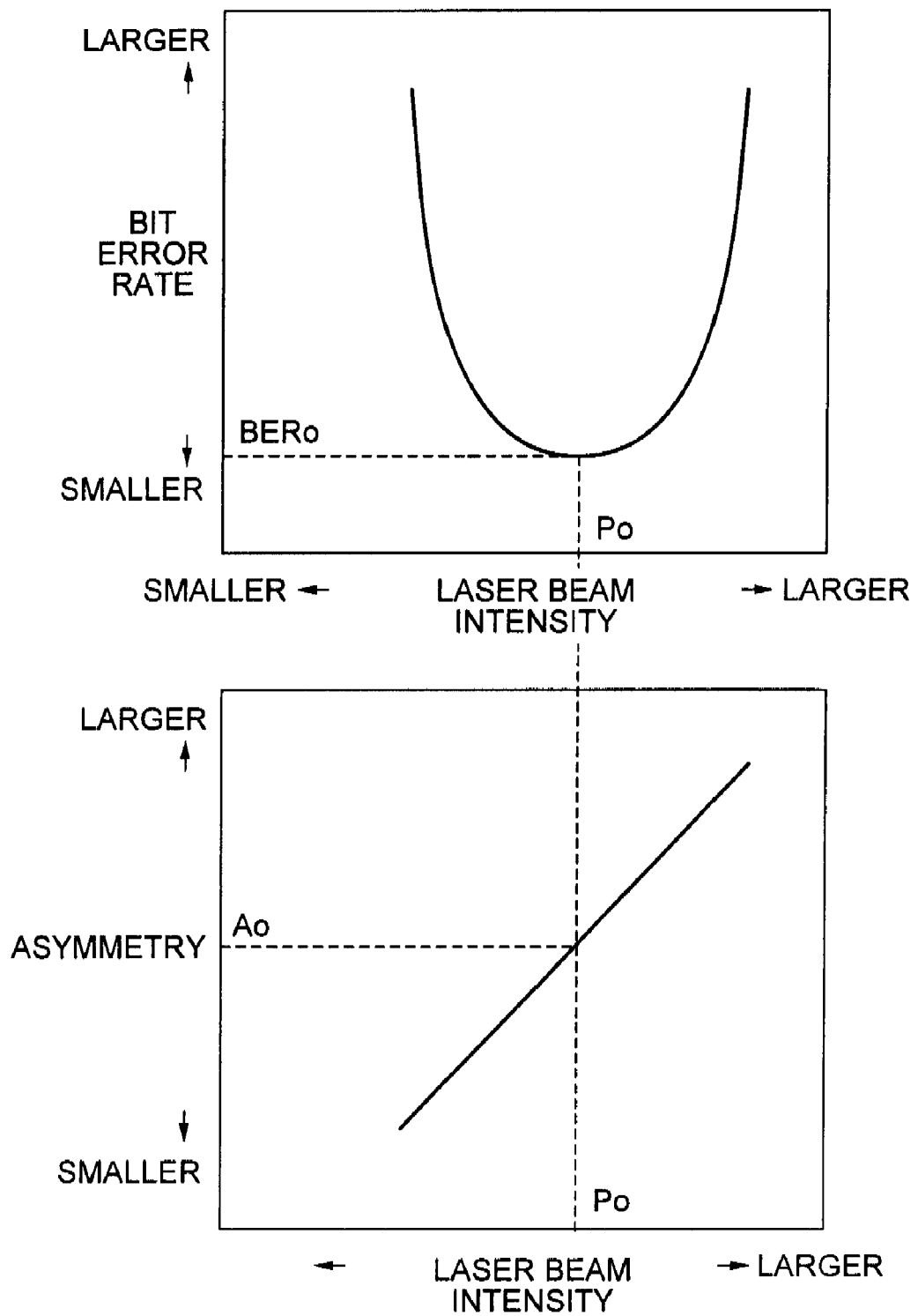
FIG. 7 is a graph showing a relation regarding a laser power, bit error rate, and asymmetry in a super resolution reproduction of a RAD method.
Figure 8:
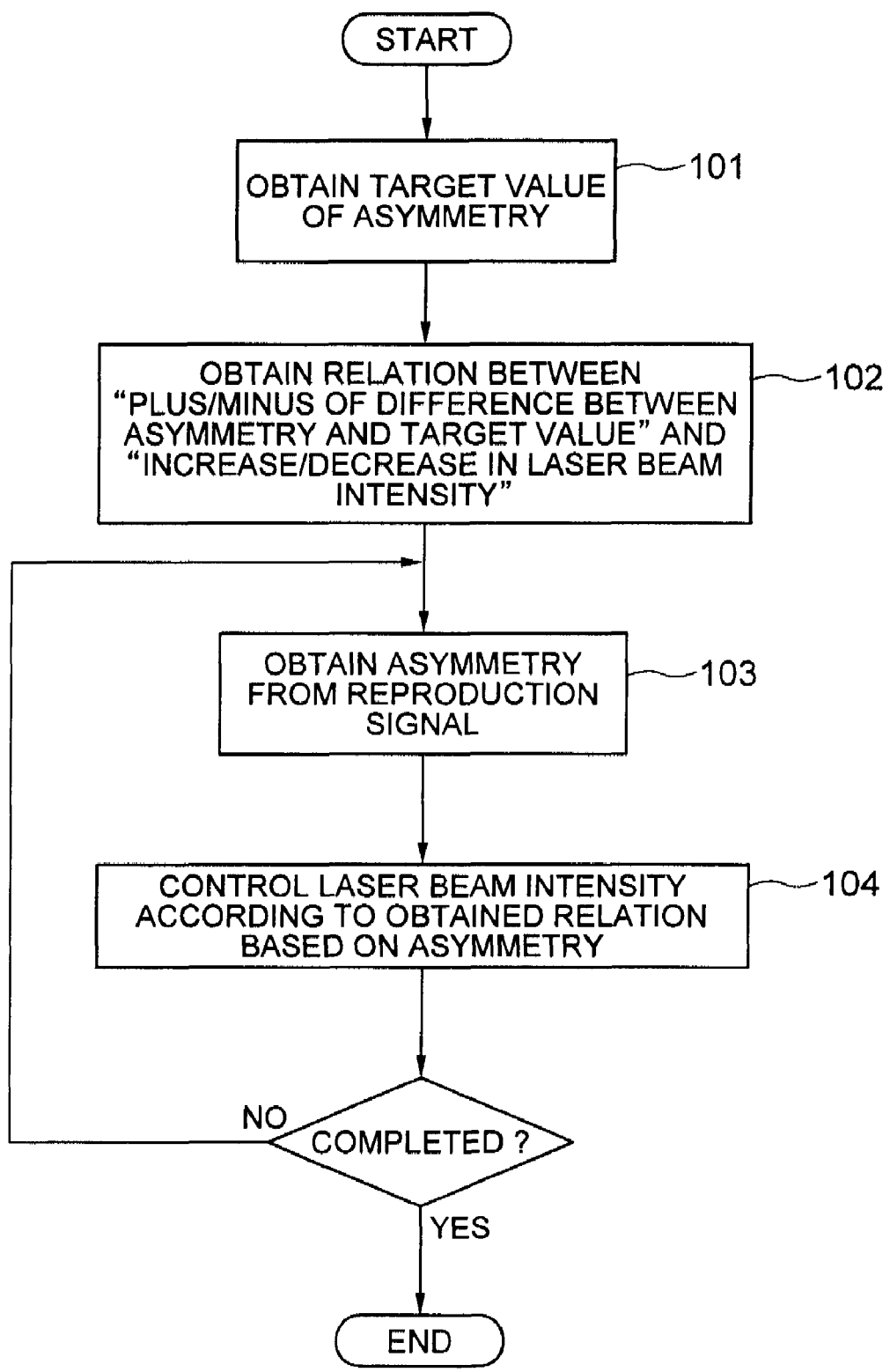
FIG. 8 is a flowchart showing an exemplary embodiment of an optical information reproducing method according to the present invention.

10 Optical information reproducing device
11 Optical head unit
12 Reproduction circuit
13 Asymmetry detection unit
14 Laser power adjusting unit
15 Laser drive unit
16 Optical information recording medium
20 Converging spot
21 Temperature increased area
22 High-temperature area (Mask part)
23 Low-temperature area (Aperture part)
24 Recorded mark
30 High-pass filter
31 Peak detection unit
32 Bottom detection unit
33 Adder
34 Subtractor
35 Divider
36 Reset unit

The invention claimed is:
1. An optical information reproducing method for performing reproduction of information by irradiating a laser beam for reproduction to an optical information recording medium in which effective spot size of the irradiated laser beam for reproduction changes in accordance with intensity of the laser beam, wherein:

asymmetry is obtained from respective maximum values and minimum values of reproduction signals, obtained by reproducing the information, of a longest mark and a shortest mark, which are recorded and formed on the optical information recording medium; and the intensity of the laser beam for reproduction is controlled based on the asymmetry.

2. The optical information reproducing method as claimed in claim 1, wherein, for obtaining the asymmetry, a following equation is used:

$$A=[(I\text{Long-}H+I\text{Long-}L)/2-(I\text{Short-}H+I\text{Short-}L)/2]/(I\text{Long-}H-I\text{Long-}L)$$

(A is asymmetry used for controlling the intensity of the laser beam for reproduction, ILong-H is the maximum value of the longest mark reproduction signal, ILong-L is the minimum value of the longest mark reproduction signal, IShort-H is the maximum value of the shortest mark reproduction signal, and IShort-L is the minimum value of the shortest mark reproduction signal).

3. The optical information reproducing method as claimed in claim 1, wherein the intensity of the laser beam for reproduction is controlled such that the asymmetry becomes close to a target value.

4. The optical information reproducing method as claimed in claim 3, wherein the target value is defined in advance.

5. The optical information reproducing method as claimed in claim 3, wherein the target value is read out from the optical information recording medium.

6. The optical information reproducing method as claimed in claim 3, wherein the target value is determined by reproducing information that is recorded to the optical information recording medium in advance.

7. The optical information reproducing method as claimed in claim 6, wherein a correlation between a bit error rate of the reproduction signal and the asymmetry is obtained by reproducing the information, and the asymmetry corresponding to a minimum value of the bit error rate is taken as the target value.

8. The optical information reproducing method as claimed in claim 6, wherein a correlation between a jitter amount of the reproduction signal and the asymmetry is obtained by reproducing the information, and the asymmetry corresponding to a minimum value of the jitter amount is taken as the target value.

9. The optical information reproducing method as claimed in claim 1, wherein a relation between plus/minus of a difference between the asymmetry and a target value and an increase/decrease of the intensity of the laser beam for reproduction is defined in advance, and the intensity of the laser beam for reproduction is controlled in accordance with the relation such that the asymmetry becomes close to the target value.

10. The optical information reproducing method as claimed in claim 1, wherein:

a relation between plus/minus of a difference between the asymmetry and a target value and an increase/decrease of the intensity of the laser beam for reproduction is determined by reproducing information that is recorded to the optical information recording medium in advance; and the intensity of the laser beam for reproduction is controlled in accordance with the relation such that the asymmetry becomes close to the target value.

11. The optical information reproducing method as claimed in claim 1, wherein the optical information recording medium includes a super resolution layer whose optical characteristic or magnetic characteristic changes nonlinearly according to a temperature or a light intensity.

12. An optical information reproducing method for performing reproduction of information by irradiating a laser beam to an optical information recording medium in which effective spot size of the irradiated laser beam changes in accordance with intensity of the laser beam, wherein:

asymmetry is obtained from respective maximum values and minimum values of reproduction signals, obtained by reproducing the information, of a longest mark and a shortest mark, which are recorded and formed on the optical information recording medium;

a correlation between PRSNR of the reproduction signal and the asymmetry is obtained by reproducing information recorded in advance to the optical information recording medium, the asymmetry corresponding to a maximum value of the PRSNR is taken as the target value, and the intensity of the laser beam is controlled such that the asymmetry becomes close to the target value.

13. An optical information reproducing method for performing reproduction of information by irradiating a laser beam to an optical information recording medium in which effective spot size of the irradiated laser beam changes in accordance with intensity of the laser beam, wherein:

asymmetry is obtained from respective maximum values and minimum values of reproduction signals, obtained by reproducing the information, of a longest mark and a shortest mark, which are recorded and formed on the optical information recording medium, a relation between plus/minus of a difference between the asymmetry and a target value and an increase/decrease of the intensity of the laser beam is read out from the optical information recording medium, and the intensity of the laser beam is controlled in accordance with the relation such that the asymmetry becomes close to the target value.

14. An optical information reproducing device for performing reproduction of information by irradiating a laser beam for reproduction to an optical information recording medium in which effective spot size of the irradiated laser beam for reproduction changes in accordance with intensity of the laser beam for reproduction, the device comprising:

an asymmetry detection device for obtaining asymmetry from respective maximum values and minimum values of reproduction signals of a longest mark and a shortest mark, which are recorded and formed on the optical information recording medium; and a laser power adjusting device for controlling the intensity of the laser beam for reproduction based on the asymmetry obtained by the asymmetry detection device.

15. The optical information reproducing device as claimed in claim 14, wherein the asymmetry detection device has a function of obtaining asymmetry A by using a calculating equation that is expressed as follows:

$$A=[(I\text{Long-}H+I\text{Long-}L)/2-(I\text{Short-}H+I\text{Short-}L)/2]/(I\text{Long-}H-I\text{Long-}L)$$

(ILong-H is the maximum value of the longest mark reproduction signal, ILong-L is the minimum value of the longest mark reproduction signal, IShort-H is the maximum value of the shortest mark reproduction signal, and IShort-L is the minimum value of the shortest mark reproduction signal).

16. The optical information reproducing device as claimed in claim 14, wherein the laser power adjusting device has a function of controlling the intensity of the laser beam for reproduction such that the asymmetry becomes close to a target value.

17. The optical information reproducing device as claimed in claim 16, comprising a device for storing the target value in advance.

18. The optical information reproducing device as claimed in claim 16, comprising a device for reading out the target value from the optical information recording medium.

19. The optical information reproducing device as claimed in claim 16, comprising a device for determining the target value by reproducing information that is recorded to the optical information recording medium in advance.

20. The optical information reproducing device as claimed in claim 14, comprising a device for storing a relation between plus/minus of a difference between the asymmetry and a target value and an increase/decrease of the intensity of the laser beam for reproduction in advance, wherein
the laser power adjusting device has a function of controlling the intensity of the laser beam for reproduction in accordance with the relation such that the asymmetry becomes close to the target value.

21. The optical information reproducing device as claimed in claim 14, comprising a device for determining a relation between plus/minus of a difference between the asymmetry and a target value and an increase/decrease of the intensity of the laser beam for reproduction by reproducing information that is recorded to the optical information recording medium in advance, wherein
the laser power adjusting device has a function of controlling the intensity of the laser beam for reproduction in accordance with the relation such that the asymmetry becomes close to the target value.

22. The optical information reproducing device as claimed in claim 14, wherein the optical information recording medium includes a super resolution layer whose optical characteristic or magnetic characteristic changes nonlinearly according to a temperature or a light intensity.

23. An optical information reproducing device for performing reproduction of information by irradiating a laser beam to an optical information recording medium in which effective spot size of the irradiated laser beam changes in accordance with intensity of the laser beam, comprising:
an asymmetry detection device for obtaining asymmetry from respective maximum values and minimum values of reproduction signals, obtained by reproducing the information, of a longest mark and a shortest mark, which are recorded and formed on the optical information recording medium;
a laser power adjusting device for controlling the intensity of the laser beam based on the asymmetry obtained by the asymmetry detection device; and
a device for reading out a relation between plus/minus of a difference between the asymmetry and a target value and an increase/decrease of the intensity of the laser beam from the optical information recording medium, wherein
the laser power adjusting device has a function of controlling the intensity of the laser beam in accordance with the relation such that the asymmetry becomes close to the target value.

24. An optical information reproducing device for performing reproduction of information by irradiating a laser beam for reproduction to an optical information recording medium in which effective spot size of the irradiated laser beam for reproduction changes in accordance with intensity of the laser beam for reproduction, the device comprising:
an asymmetry detection means for obtaining asymmetry from respective maximum values and minimum values of reproduction signals, obtained by reproducing the information, of a longest mark and a shortest mark, which are recorded and formed on the optical information recording medium; and
a laser power adjusting means for controlling the intensity of the laser beam for reproduction based on the asymmetry obtained by the asymmetry detection means.

25. An optical information recording medium in which effective spot size of an irradiated laser beam for reproduction changes in accordance with intensity of the laser beam for reproduction, wherein a target value of asymmetry for controlling the intensity of the laser beam for reproduction is recorded.

26. The optical information recording medium as claimed in claim 25, comprising a super resolution layer whose optical characteristic or magnetic characteristic changes nonlinearly according to a temperature or a light intensity.

27. An optical information recording medium in which effective spot size of an irradiated laser beam changes in accordance with intensity of the laser beam, wherein a relation between plus/minus of a difference between asymmetry and a target value and an increase/decrease of the intensity of the laser beam is recorded.

28. An optical information recording medium in which effective spot size of an irradiated laser beam for reproduction changes in accordance with intensity of the laser beam, the medium including an area where information for determining a target value of asymmetry is recorded in advance for controlling the intensity of the laser beam for reproduction.

\* \* \* \* \*